United States Patent
Ye et al.

(10) Patent No.: US 12,122,961 B2
(45) Date of Patent: Oct. 22, 2024

(54) SYSTEM FOR CATALYTIC CRACKING OF NAPHTHA WITH MIXED SPENT AND REGENERATED CATALYST

(71) Applicants: SABIC Global Technologies B.V., Bergen op Zoom (NL); DALIAN INSTITUTE OF CHEMICAL PHYSICS, CHINESE ACADEMY OF SCIENCES, Liaoning (CN)

(72) Inventors: Mao Ye, Liaoning (CN); Yinfeng Zhao, Liaoning (CN); Zhongmin Liu, Liaoning (CN); Hailong Tang, Liaoning (CN); Jing Wang, Liaoning (CN); Jinling Zhang, Liaoning (CN); Tao Zhang, Liaoning (CN); Talal Khaled Al-Shammari, Riyadh (SA)

(73) Assignees: SABIC GLOBAL TECHNOLOGIES B.V., Bergen op Zoom (NL); DALIAN INSTITUTE OF CHEMICAL PHYSICS, CHINESE ACADEMY OF SCIENCES, Liaoning (CN)

( * ) Notice: Subject to any disclaimer, the term of this patent is extended or adjusted under 35 U.S.C. 154(b) by 776 days.

(21) Appl. No.: 17/421,576

(22) PCT Filed: Jan. 28, 2019

(86) PCT No.: PCT/IB2019/050688
§ 371 (c)(1),
(2) Date: Jul. 8, 2021

(87) PCT Pub. No.: WO2020/157539
PCT Pub. Date: Aug. 6, 2020

(65) Prior Publication Data
US 2022/0119719 A1  Apr. 21, 2022

(51) Int. Cl.
*B01J 8/18* (2006.01)
*B01J 8/24* (2006.01)
(Continued)

(52) U.S. Cl.
CPC ............ *C10G 11/182* (2013.01); *B01J 8/1863* (2013.01); *B01J 8/1872* (2013.01); *B01J 8/24* (2013.01);
(Continued)

(58) Field of Classification Search
CPC .......... C10G 11/182; C10G 2300/1044; C10G 2300/4018; C10G 2300/4025;
(Continued)

(56) References Cited

U.S. PATENT DOCUMENTS 4,871,446 A   10/1989  Herbst et al.
4,874,503 A   10/1989  Herbst et al.

FOREIGN PATENT DOCUMENTS

CN   102295510 A   12/2011
CN   102876363 A    1/2013
(Continued)

OTHER PUBLICATIONS

Machine translation for CN-105085131 A1 (Year: 2024).*
International Search Report and Written Opinion from PCT/IB2019/050688 dated Nov. 18, 2019, 9 pages.

*Primary Examiner* — Huy Tram Nguyen
(74) *Attorney, Agent, or Firm* — Norton Rose Fulbright US LLP

(57) ABSTRACT

The present disclosure includes a system for producing low carbon olefins and/or aromatics from raw material comprising naphtha. The system can include a reaction unit that includes a fast fluidized bed reactor, a stripping unit that includes a stripper, and a regeneration unit. The reactor unit is adapted to allow the catalytic cracking of naphtha and to
(Continued)

output reaction unit effluent material (spent catalyst and product gas) into the stripping unit, which is adapted to output product gas. The stripping unit is connected to and in fluid communication with the regeneration unit such that the stripping unit supplies the spent catalyst from the reaction unit to regeneration unit. The regeneration unit is adapted to regenerate the spent catalyst to form regenerated catalyst. The regeneration unit is connected to and in fluid communication with the fast fluidized bed reactor such that, in operation, regenerated catalyst can be sent to the fast fluidized bed reactor of the reaction unit.

20 Claims, 1 Drawing Sheet

(51) Int. Cl.
*B01J 35/40* (2024.01)
*B01J 35/51* (2024.01)
*C10G 11/18* (2006.01)

(52) U.S. Cl.
CPC ............... *B01J 35/40* (2024.01); *B01J 35/51* (2024.01); *B01J 2208/00991* (2013.01); *C10G 2300/1044* (2013.01); *C10G 2300/4018* (2013.01); *C10G 2300/4025* (2013.01); *C10G 2300/4093* (2013.01); *C10G 2300/701* (2013.01); *C10G 2300/703* (2013.01); *C10G 2400/20* (2013.01); *C10G 2400/30* (2013.01)

(58) Field of Classification Search
CPC ...... C10G 2300/4093; C10G 2300/701; C10G 2300/703; C10G 2400/20; C10G 2400/30; C10G 11/18; B01J 8/1863; B01J 8/1872; B01J 8/24; B01J 35/40; B01J 35/51; B01J 2208/00991
USPC .......................................................... 422/144
See application file for complete search history.

(56) References Cited

FOREIGN PATENT DOCUMENTS

| CN | 103666551 A | 3/2014 |
| CN | 105085131 A * | 11/2015 |

* cited by examiner

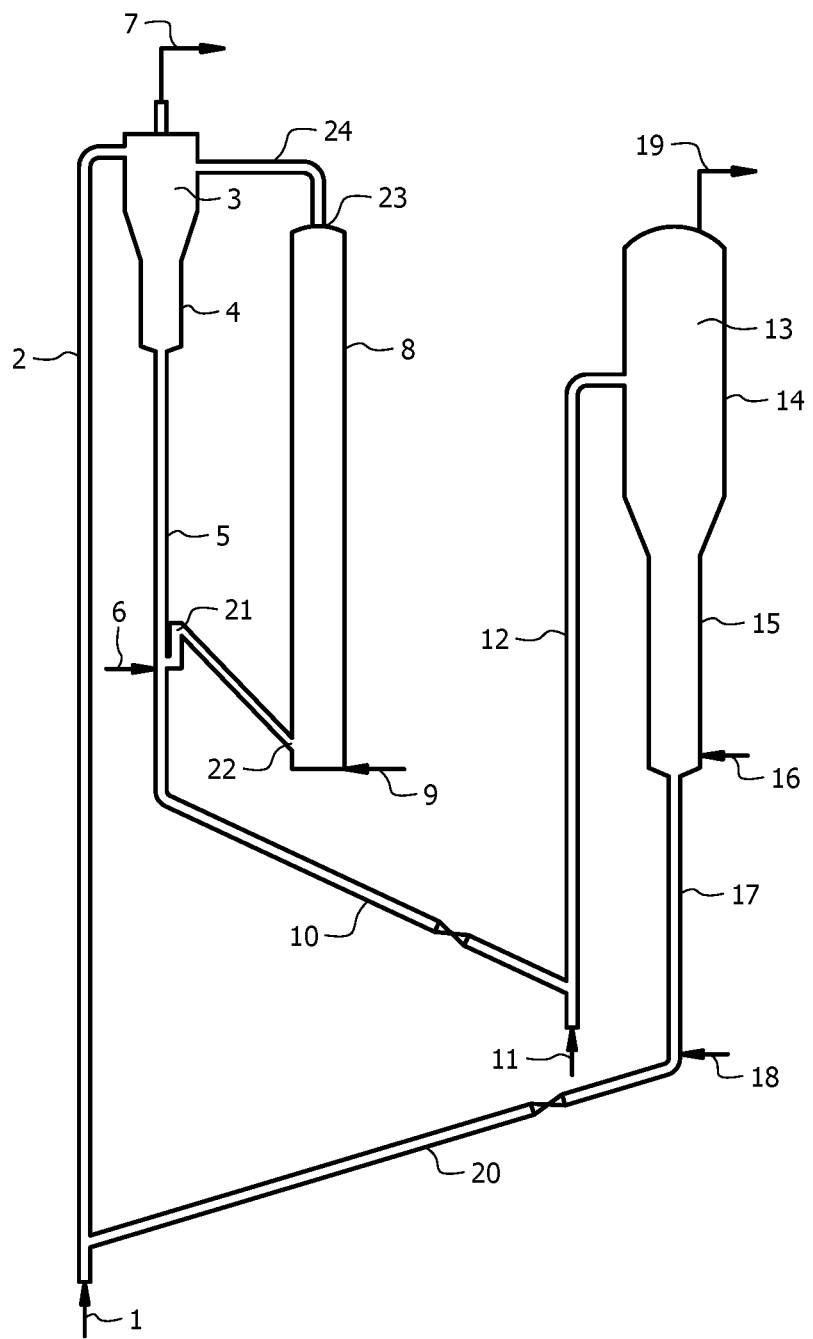

SYSTEM FOR CATALYTIC CRACKING OF NAPHTHA WITH MIXED SPENT AND REGENERATED CATALYST

CROSS REFERENCE TO RELATED APPLICATION

This application is a national phase application under 35 U.S.C. § 371 of International Application No. PCT/IB2019/050688 filed Jan. 28, 2019, which is related to PCT Application No. PCT/IB2019/050689, filed Jan. 28, 2019, and entitled, "METHOD FOR THE CONVERSION OF FEEDSTOCK CONTAINING NAPHTHA TO LOW CARBON OLEFINS AND AROMATICS," the disclosure of which is incorporated by reference herein in its entirety.

FIELD OF INVENTION

The present application relates to a system for catalytically cracking naphtha to produce low-carbon olefins (light olefins or $C_2$ to $C_4$ olefins) and/or aromatics.

BACKGROUND OF THE INVENTION

Naphtha is one of the most important raw materials for ethylene and propylene production. High temperature steam cracking of naphtha to produce ethylene and propylene is well-established in the petrochemical industry. Every year hundreds of million tons of naphtha are used to produce ethylene and propylene, which accounts for more than 50% of the total production of ethylene and propylene. After years of development, steam cracking technology has reached such a high level, that its rate of conversion of naphtha to olefins and aromatics is high. But steam cracking has obvious shortcomings. In steam cracking, selectivity is poor, a large amount of methane is generated in the product, the reaction temperature is high, and the energy consumption is high. The potential to develop steam cracking further is small. Therefore, the use of catalytic cracking technology to reduce the cracking temperature has been vigorously pursued. At present, naphtha catalytic cracking technology is mainly carried out through riser reactor to improve the yield of ethylene and propylene. However, naphtha pyrolysis in riser reactors is significant and methane yield is relatively high, both of which are undesirable.

BRIEF SUMMARY OF THE INVENTION

The problems associated with conventional catalytic cracking technology described above can be solved by the technical scheme disclosed in this application. Embodiments of the disclosure include a system for producing low-carbon olefins and/or aromatics. According to embodiments of the invention, the system includes fast fluidized bed reactor 8, stripper 3, and regenerator 13. Stripper 3 can include settling section 4 and stripper section 5. Regenerator 13 can include settling section 14, regenerator 15, and stripper section 17. At the top of stripper 3 is gas outlet 7, in embodiments of the disclosure. The bottom end of stripper section 5, in embodiments of the disclosure, is connected to and in fluid communication with regenerator settlement section 14 via stripper inclined tube 10 and riser 12. The bottom end of regenerator stripping section 17 is connected to and in fluid communication with stripper settlement section 4 via regenerator inclined tube 20 and regenerator riser 2.

Optionally, in the system for catalytically cracking naphtha to produce low-carbon olefins and aromatics, the lower part of fast fluidized bed reactor 8 is a dense phase region and the upper part of fast fluidized bed 8 is a dilute phase region.

Optionally, the system for catalytically cracking naphtha to produce low-carbon olefins and aromatics is adapted such that the feedstock comprising naphtha flows through a naphtha inlet located at the bottom of fast fluidized bed reactor 8, and catalyst enters fast fluidized bed reactor 8 through a catalyst inlet located above the naphtha inlet and in the dense phase zone.

Optionally, the system for catalytically cracking naphtha to produce low-carbon olefins and aromatics comprises a bubbling fluidized bed regenerator or a turbulent fluidized bed regenerator.

Optionally, the system for catalytically cracking naphtha to produce low-carbon olefins and aromatics comprises a gas-solid separation device inside stripper 3.

Optionally, the system for catalytically cracking naphtha to produce low-carbon olefins and aromatics comprises material valve 21 for controlling circulation of catalyst between stripper 3 and fast fluidized bed reactor 8.

Optionally, the system for catalytically cracking naphtha to produce low-carbon olefins and aromatics includes the uppermost surface of catalyst in stripper stripping section 5 being higher than the position of material valve 21.

The system for catalytically cracking naphtha to produce low-carbon olefins and aromatics includes a fast fluidized bed reactor, a stripper and a fluidized bed regenerator. In a fast fluidized bed reactor, the volume content of catalyst is higher than that in a riser reactor, which improves the role of catalyst and reduces the influence of pyrolysis reaction.

In embodiments of the disclosure, the system for catalytically cracking naphtha to produce low-carbon olefins and aromatics comprises a reaction unit, a stripping unit, and a regeneration unit. In embodiments of the disclosure, the reaction unit includes a fast fluidized bed reactor that is adapted to receive feedstock comprising naphtha at the bottom of the fast fluidized bed reactor and contact the catalyst disposed in the fast fluidized bed reactor. In embodiments of the disclosure, the stripping unit, includes one or more strippers; and the regeneration unit includes one or more regenerators. The reaction unit according to embodiments of the disclosure, is in fluid communication with the stripping unit, where the stripping unit is in fluid communication with the regeneration unit, such that a circulating loop is formed.

According to embodiments of the invention, the material (e.g., product gas and spent catalyst) from the reaction unit is sent to the stripping unit and the product gas is separated from the spent catalyst. The product gas is then flowed from the stripping unit. The stripping unit is connected to the regeneration unit so that spent catalyst to be regenerated, which is obtained from the reaction unit is supplied to the regeneration unit through the stripping unit. The system is configured so that the regenerated catalyst is routed from the regeneration unit to the fast fluidized bed reactor of the reaction unit, via the stripping unit. In the stripping unit, the spent catalyst and regenerated catalyst are mixed together. A portion of the mixed catalyst is supplied to the fast-fluidized bed reactor, and a portion of the mixed catalyst supplied to the regenerator.

Optionally, the fast bed fluidized bed reactor has a catalyst inlet at the bottom (or at least the lower half) of the fast bed fluidized reactor so that feedstock comprising naphtha that is fed in the fast fluidized bed reactor contacts the catalyst.

Optionally, the fast fluidized bed reactor comprises an outlet adapted to output product gas from the top (or at least the upper half) of the fast fluidized bed reactor.

Optionally, the catalyst inlet to the fast fluidized bed reactor and the feedstock inlet are located such that catalyst and naphtha both flow upwards as each contacts the other in the fast fluidized bed reactor.

Optionally, the reaction unit is connected to and in fluid communication with a circulating pipeline that is connected to and in fluid communication with the stripping unit, and the stripping unit is connected to and in fluid communication with the circulating pipeline of the regenerating unit.

Optionally, the fast fluidized bed reactor is adapted to operate such that a lower part of the fast fluidized bed reactor (such as the lower half) is a dense phase region and the upper part (such as the upper half) is a dilute phase region.

Optionally, at least two feed ports are located in the dense phase region of the fast fluidized bed reactor, one to input feedstock comprising naphtha and the other to input catalyst.

Optionally, the feed port for feedstock comprising naphtha is located below the feed port for the input catalyst.

Optionally, disposed in the fast fluidized bed reactor is a microsphere catalyst, wherein the zeolite content in the microsphere catalyst is 10-50%.

Optionally, the upper limit of zeolite content in the microsphere catalyst is 20%, 30%, 40% or 50%, and the upper limit is 10%, 20%, 30% or 40%, wherein the foregoing upper limit zeolite contents can be combined with any of the foregoing lower limit zeolite contents to create a zeolite content range for the reaction conditions, from a lower value to a higher value.

Optionally, the average diameter of the microsphere catalyst is preferably 30 to 300 microns.

Optionally, the average diameter of the microsphere catalyst is optimized to be 50-150 microns.

Optionally, the catalyst is a microspheric catalyst containing ZSM-5 zeolite.

Optionally, the molding of the microsphere catalyst comprises: spraying and drying the slurry containing molecular sieve and binder.

Optionally, the stripper comprises a settling section and a stripping section, a product gas outlet located at the top (or at least at the top half of the stripper), and a gas-solid separation device disposed inside the stripper.

Optionally, the lower part of stripping section of the stripper is connected by pipe to the fast fluidized bed reactor, with a material valve located on the pipeline for regulating material flow from the stripping section to the pipeline and ultimately to the fast fluidized bed reactor.

Optionally, the material valve is arranged at the lower part of the stripping section of the stripper and an upper portion of the pipeline connection such that the material valve regulates material flow from the stripping section to the pipeline and ultimately to the fast fluidized bed reactor.

Optionally, the material valve is located lower than the location of the top surface of the catalyst in the stripping section of the stripper.

Optionally, the material valve is a plug valve or a slide valve.

Optionally, the regenerator comprises a settling section, a regenerating (reaction) section and a stripping section, with a regenerator flue gas pipeline at the top (or at least a upper half) of the regenerator; where the lower part of the stripper stripping section is connected to and in fluid communication with the regenerator settling section via a stripper inclined pipe and a regenerator riser.

Optionally, the regenerator is a bubbling fluidized bed or a turbulent fluidized bed.

Optionally, a gas inlet is located at the bottom of the stripper stripping section.

Optionally, a gas inlet is located at the bottom of the regenerator riser.

Optionally, the stripper settling section is connected and in fluid communication with the regenerator stripping section via the regenerator riser and the stripper inclined pipe.

Optionally, the bottom (or at least a lower half) of the regenerator riser of the stripper is provided with a regenerator riser gas inlet for receiving gas into the regenerator riser, where the gas passing through the regenerator gas inlet transports spent catalyst from the stripper up the riser and into the regenerator.

Optionally, the bottom (or at least a lower half) of the regenerator stripping section is provided with a regenerator stripping section gas inlet for receiving gas into the regenerator stripping section, where the gas passing through the regenerator stripping section gas inlet transports regenerated catalyst from the regenerator stripping section to into the regenerator inclined pipe.

The beneficial effects of embodiments of the invention as disclosed in this application include:

1) The volume content in a fast fluidized bed reactor, according to embodiments of the invention is higher than the volume content in a conventional riser reactor, which improves the effectiveness of catalyst and reduces the influence of pyrolysis reaction in embodiments of the invention as compared to conventional naphtha cracking processes.

2) The yield of low carbon olefin can reach 47 wt. %, the yield of aromatics can reach 20 wt. % and the yield of methane can be reduced to 7 wt. % in the product, in the naphtha conversion process, according to embodiments of the invention.

3) There is a reduction in the extent of pyrolysis reaction in naphtha catalytic cracking, which reduces the yield of methane in the product and improves the utilization of carbon atoms, in methods according to embodiments of the invention.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

The term "connected" is defined as coupled, although not necessarily directly, and not necessarily mechanically; two items that are "connected" may be unitary with each other.

The term "fast fluidized bed reactor" is defined as a fluidized bed reactor where the catalyst is Geldart A particle[1] and the operation gas line velocity is between 2 and 10 m/s, and where there is a "dense phase region" and a "dilute phase region" in the reactor.

[1] See Deldart D. Types of fluidization, Powder Technology, 1973, 7: 285-290.

The term "dense phase region" is defined as the region where the volume fraction of catalyst is more than 0.1 in the reactor; the volume fraction is the value of volume of catalyst in a certain region in the reactor divided by volume of the certain region in the reactor.

The term "dilute phase region" is defined as the region where the volume fraction of catalyst is less than 0.1 in the reactor.

BRIEF DESCRIPTION OF THE DRAWINGS

FIG. 1 is a diagram of a system, according to embodiments of the invention. The labels in FIG. 1 have the following meanings: 1: stripper riser inlet, 2: stripper riser, 3: stripper, 4: stripper settling section, 5: stripper stripping section, 6: stripper inlet, 7: product gas outlet, 8: fast fluidized bed reactor, 9: fast fluidized bed reactor feedstock inlet, 10: stripper inclined pipe, 11: regenerator riser inlet, 12: regenerator riser, 13: regenerator, 14: regenerator settling section, 15: regenerator reaction section, 16: regenerator gas inlet, 17: regenerator stripping section, 18: regenerator stripping section gas inlet, 19: regenerator flue gas pipeline, 20: regenerator inclined pipe, and 21: material valve.

DETAILED DESCRIPTION OF THE INVENTION

FIG. 1 shows a system for implementing a method of producing low carbon olefins and aromatics from feedstock comprising naphtha, according to embodiments of the invention. The system for producing low carbon olefins and/or aromatics comprises three main components, namely, fast fluidized bed reactor 8, stripper 3, and regenerator 13, where fast fluidized bed reactor 8 is connected to and in fluid communication with stripper 3 and stripper 3 is connected to and in fluid communication with regenerator 13.

Fast fluidized bed reactor 8 is adapted to contact feedstock comprising naphtha with catalyst. As shown in FIG. 1, in embodiments of the disclosure, fast fluidized bed reactor 8 includes fast fluidized bed reactor feedstock inlet 9, which is adapted to allow feedstock material into fast fluidized bed reactor 8 to receive feedstock. Fast fluidized bed reactor 8 also includes fast fluidized bed reactor catalyst inlet 22, which is adapted to allow fast fluidized bed reactor 8 to receive regenerated catalyst. Fast fluidized bed reactor 8 also includes an outlet 23 for allowing effluent material to leave fast fluidized bed reactor 8. The fluid communication between fast fluidized bed reactor 8 and stripper 3 can be provided by pipe 24.

As shown in FIG. 1, in embodiments of the disclosure, stripper 3 comprises one or more gas-solid separators, stripper settling section 4, and stripper settling section 5. The one or more gas-solid separators, for example, can separate gas product from spent catalyst emanating from fast fluidized bed reactor 8. The gas product can be withdrawn from stripper 3 through product gas outlet 7. Stripper settling section 4 is adapted to collect the spent catalyst from reactor 8 through pipe 22 and regenerated catalyst from regenerator 13 through stripper riser 2, and separate the stripping gas and catalyst from the stripper stripping section 5. For example, the line velocity of spent catalyst and gas can be decreased, the stripping gas can be withdrawn from stripper 3 through product gas outlet 7, the catalyst from stripping section 5 settle down, the spent catalyst and regenerated catalyst settle down in settling section 4 after which it moves to stripper stripping section 5. Stripper stripping section 5, in embodiments of the disclosure, is adapted to remove hydrocarbon material from solids such as spent catalyst, the spent catalyst and regenerated catalyst mix together. The mixture of spent catalyst and regenerated catalyst can be routed to the fast-fluidized bed reactor and the regenerator. In this way, a first portion of the mixed catalyst can be routed to the fast-fluidized bed reactor and a second portion of the mixed catalyst can be routed to the regenerator. Stripper inlet 6 allows gas to be flowed into stripper stripping section 5 to facilitate the removal of hydrocarbons from the spent catalyst. Material valve 21 regulates the movement of partial mixture of spent and regenerated catalyst to fast fluidized bed reactor 8 and/or stripper inclined pipe 10. According to embodiments of the disclosure, stripper inclined pipe 10 provides a connection and fluid communication between stripper stripping section 5 and regenerator riser 12. Thus, for example, a portion of mixture of spent and regenerated catalyst can move from stripper stripping section 5 to regenerator riser 12. Configuring stripper inclined pipe 10 to be at an angle less than 90 degrees to the horizontal plane as shown in FIG. 1, according to embodiments of the disclosure, allows movement of the spent catalyst closer towards regenerator section 13.

Regenerator riser gas intake 11 can be located at the bottom of regenerator riser 12 so that gas can be received in regenerator riser 12 and move spent catalyst up regenerator riser 12 and into regenerator 13.

Regenerator 13 can include regenerator settling section 14, regenerator reaction section 15, regenerator gas inlet 16, regenerator stripping section 17 and regenerator stripping section gas inlet 18. According to embodiments of the disclosure, regenerator settling section 14 is adapted to settle down the regenerated catalyst from the regenerator reaction section 15. In operation, spent catalyst moves from regenerator settling section 14 to regenerator reaction section 15, where the spent catalyst is contacted with gas that flows through regenerator gas inlet under conditions sufficient to regenerate the spent catalyst and form regenerated catalyst. The regenerated catalyst then moves to regenerator stripping section 17 where the regenerated catalyst can be stripped of hydrocarbons by gas that flows through regenerator stripping section gas inlet 18. After stripping, the stripped regenerated catalyst moves to stripper riser 2, where such movement is facilitated by regenerator inclined pipe 20 being at an angle less than 90 degrees to the horizontal plane as shown in FIG. 1. According to embodiments of the disclosure, regenerator inclined pipe 20 is directly in fluid communication with regenerator stripping section 17 and stripper riser 2. Indirectly, regenerator inclined pipe 20 is in fluid communication with regenerator 13 and stripper 3, according to embodiments of the disclosure.

Stripper riser 2 connects and is in fluid communication with regenerator inclined pipe 20 and stripper 3, in embodiments of the invention. In this way, stripper riser 2 can receive regenerated catalyst from regenerator inclined pipe 20 and the regenerated catalyst can be moved up stripper riser 2 and into stripper 3 by the flow of gas received through stripper riser inlet 1. As noted above, the system of FIG. 1 can be used to implement a method of producing low carbon olefins and aromatics from feedstock comprising naphtha, according to embodiments of the invention. The method can include flowing raw material (feedstock) that includes naphtha into fast fluidized bed reactor 8, through fast fluidized bed reactor feedstock inlet 9 so that the naphtha of the raw material contacts catalyst of a fluidized bed that is present in fluidized bed reactor 8. The reaction conditions in fluidized bed reactor 8 are such that the contacting of the naphtha with the catalyst generates a gas product comprising one or more olefins and/or one or more aromatics and spent catalyst. A mixture of the gas product and the spent catalyst is flowed from fluidized bed reactor 8 to stripper 3. Stripper 3 is adapted to separate solid from gas and separates the gas product from the spent catalyst. The separated gas product is flowed from stripper 3 through outlet pipeline 7 and the spent catalyst moves to stripper settling section 4. The product gas flows from product gas outlet pipeline 7 to a separation system (not shown) that separates the product gas into a stream comprising primarily low-carbon olefins and aromatics. Stripper settling section 4 collects the catalysts from reactor 8, regenerator 13 and stripper stripping section 5. The spent catalyst moves from settling section 4 to stripping section 5. Stripping section 5 strips hydrocarbons from the spent catalyst. The spent catalyst is routed to regenerator 13 via stripper inclined pipe 10 and riser 12. Gas can be flowed through regenerator riser gas intake 11 to carry the spent catalyst up regenerator riser 12 and into regenerator settling section 14. Regenerator settling section 14 can settle down the regenerated catalyst from the regenerator reaction section 15. From regenerator settling section 14, the spent catalyst can be moved to regenerator reactor section 16. Regenerator reaction section 16 regenerates the spent catalyst as the spent catalyst, thereby forming regenerated catalyst. An oxidant (e.g., gas or mixture of oxygen and nitrogen, carbon dioxide or other inert gas) is flowed through regenerator intake 16 so that the oxidant contacts the spent catalyst and causes deposited carbon to be reacted and form carbon monoxide or carbon dioxide and thereby regenerate the spent catalyst to regenerated catalyst. Regenerated catalyst is transported from regenerator reaction section 15 to regeneration stripping section 17. In regeneration stripping section 17, the regenerated catalyst is contacted with stripping gas that is supplied through regenerator stripping section intake 18. The stripping gas (e.g., gas) separates hydrocarbons from regenerated catalyst in regenerator stripping section 17 so that stripped regenerated catalyst is transported into regenerator inclined pipe 20, then into riser 2, where gas flow into riser 2 through riser inlet 1 lifts the stripped regenerated catalyst up riser 2 and into stripper 3. Regenerator stripping section 17 is in fluid communication with regeneration inclined section 20, which in turn is in fluid communication with riser 2, which in turn is in fluid communication with stripper 3. Stripper 3 separates the stripped regenerated catalyst from the gas that is provided through riser inlet 1. After gas-solid separation in stripper 3, the stripped regenerated catalyst enters fast fluidized bed reactor 8 through stripper stripping section 5 and material valve 21.

EXAMPLES

The present application is described in detail below in connection with embodiments, but this application is not limited to these embodiments. If not specified, the raw materials in the application are purchased through commercial channels. In the embodiments of the invention, the catalyst is a "microsphere catalyst containing having naphtha catalytic cracking activity," which is can be prepared according to the method of patent CN200710118286.3. The analysis method used to analyze in the implementation of the disclosure in this application is as follows: The products were analyzed by Agilent gas chromatography. In the implementation of this application, the olefin yield, aromatics yield and methane yield are were calculated on the basis of mass as follows: Olefin yield=(olefin mass content in product*product mass flow rate)/(product mass flow rate+ coke generation rate); aromatics yield=(aromatics mass content in product*product mass flow rate)/(product mass flow rate+coke generation rate); methane yield=(methane mass content in product*product mass flow rate)/(product mass flow rate+coke generation rate) coke rate).

Example 1

In the system shown in FIG. 1, the catalyst was a microsphere catalyst with naphtha catalytic cracking activity. The weight content of molecular sieve in the catalyst was 30%, and the particle size range was 30-300 microns. The naphtha feed was fed into the fast fluidized bed reactor 8 through the feed port 9 of the fast fluidized bed reactor and contacted the catalyst. The product was fed into the gas outlet pipeline of 7 products. The catalyst entered the stripper 3. The nitrogen gas was fed into the gas inlet 6 of the stripper. After stripping with nitrogen gas, the product was fed into the oblique tube 10 and the riser 12. The regenerator riser 11 intake port input nitrogen gas and entered the regenerator. The regenerated catalyst entered the fast fluidized bed reactor through the regenerator stripping section and the regeneration inclined tube. The regenerator flue gas pipeline 19 output the flue gas. The regenerated catalyst entered the stripper 3 through the regenerator stripping section 17, the regeneration inclined tube 20 and the lifting tube 2. After solid separation, the catalyst passed through stripper stripping section 5 and feed valve 21 to fast bed reactor 8. The product gas entered the separation system through 7 product gas outlet pipelines, and different products were obtained. Catalyst circulation was controlled by a plug valve or slide valve. The composition of the naphtha is shown in Table 1. The reaction conditions of the fast fluidized bed reactor were as follows: reaction temperature 580° C., reaction pressure 0.01 MPa with gauge pressure, gas phase linear velocity 2 m/s, agent-oil ratio 10. Through on-line chromatographic analysis, the yields of olefins, aromatics and methane were 38%, 15%, and 7%, respectively, as measured by on-line chromatographic analysis of the product gas.

TABLE 1

Composition of Naphtha

| Composition (wt. %) | Naphtha (IBP-150° C.) | Naphtha (IBP-180° C.) |
|---|---|---|
| n-Paraffins | 41 | 35 |
| i-Paraffins | 24 | 29 |
| Naphthenics | 15 | 28 |
| Aromatics | 14 | 7 |

Example 2

According to the conditions and steps described in Example 1, the catalyst was a microsphere catalyst containing naphtha catalytic cracking activity. The weight content of molecular sieve in the catalyst was 10%, and the particle size range was 50-150 microns. The conditions of fast fluidized bed reactor were as follows: reaction temperature 650° C., reaction pressure 0.1 MPa with gauge pressure, gas phase linear velocity 5 m/s, agent-oil ratio 20. As measured by on-line chromatographic analysis of the product gas, the yields of olefins, aromatics and methane were 43%, 20%, and 7%, respectively.

Example 3

According to the conditions and steps described in Example 1, the catalyst was a microsphere catalyst containing naphtha catalytic cracking activity. The weight content of the molecular sieve in the catalyst was 50%, and the particle size range was 50-150 microns. The reaction conditions of the fast fluidized bed reactor were as follows: reaction temperature 690° C., reaction pressure 0.2 MPa with gauge pressure, gas phase linear velocity 10 m/s, agent-oil ratio 80. The yields of olefins, aromatics and methane were 46%, 15%, and 8%, respectively, as measured by on-line chromatographic analysis of the product gas.

Example 4

According to the conditions and steps described in Example 1, the catalyst was a microsphere catalyst containing naphtha catalytic cracking activity. The weight content of the molecular sieve in the catalyst was 50%, and the particle size range was 50-150 microns. The conditions of the fast fluidized bed reactor were as follows: reaction temperature 690° C., reaction pressure 0.01 MPa with gauge pressure, gas phase linear velocity 8 m/s, agent-oil ratio 20. The yields of olefins, aromatics and methane were 48%, 19%, and 8%, respectively, as measured by on-line chromatographic analysis of the product gas.

Example 5

According to the conditions and steps described in Example 1, the catalyst was a microsphere catalyst containing naphtha catalytic cracking activity. The weight content of molecular sieve in the catalyst was 30%, and the particle size range was 50-150 microns. The conditions of the fast fluidized bed reactor were as follows: reaction temperature 720° C., reaction pressure 0.3 MPa with gauge pressure, gas phase linear velocity 10 m/s, agent-oil ratio 50. The yields of olefins, aromatics and methane were 47%, 15%, and 8%, respectively, as measured by on-line chromatographic analysis of the product gas.

As mentioned above, only a few examples of this application do not restrict the application in any form. Although the application is disclosed as above in better embodiments, it is not intended to restrict the application. Any technical personnel familiar with the profession shall make use of the disclosed technology within the scope of the technical scheme of this application. Allowing for a little change or modification is equivalent to the equivalent implementation case, which belongs to the scope of the technical scheme.

What is claimed is:

1. A system for catalytic cracking of naphtha, the system comprising:
    a reaction unit that includes a fast fluidized bed reactor adapted to receive raw material comprising naphtha and to contact the raw material with catalyst so as to cause cracking of the naphtha comprised in the raw material and thereby form gas product and spent catalyst;
    a stripping unit, adapted to mix the spent and regenerated catalyst to form a mixed catalyst wherein the stripping unit includes a stripper adapted to separate hydrocarbons from the mixed catalyst and supply a first portion of the mixed catalyst to the fast-fluidized bed reactor and a second portion of the mixed catalyst to the regenerator, wherein the stripping unit is connected to and in fluid communication with fast fluidized bed reactor; and
    a regeneration unit that includes a regenerator adapted to regenerate the second portion of the mixed catalyst, wherein the regeneration unit is connected to and in fluid communication with the stripper and the fast fluidized bed reactor.

2. The system of claim 1, wherein the lower half of the fast fluidized bed reactor comprises a dense phase region and the upper half of the fast fluidized bed reactor comprises a dilute phase region.

3. The system of claim 2, wherein one or more ports are located in the dense phase region of the fast fluidized bed reactor, the one or more ports adapted to allow input of the raw material and the regenerated catalyst.

4. The system of claim 1, wherein the stripper comprises a stripper settling section, a stripper stripping section, a product gas outlet located at the upper half of the stripper, and one or more gas-solid separation device(s) disposed inside the stripper.

5. The system of claim 4, wherein the lower half of the stripper stripping section is connected to and in fluid communication with (1) a material valve and (2) a pipeline connected to and in fluid communication with the fast fluidized bed reactor.

6. The system of claim 4, wherein the regenerator includes a regenerator settling section, a regenerator reaction section, and a regenerator stripping section, the stripper stripping section is connected to and in fluid communication with the regenerator settling section by a stripper inclined pipe and a regenerator riser.

7. The system of claim 6, wherein the stripper settling section is connected to and in fluid communication with the regenerator stripping section via the regeneration inclined pipe and the regeneration riser.

8. The system of claim 4, wherein a gas stripping gas inlet is located within the lower half of the stripping section of the stripper.

9. The system of claim 1, wherein the stripping gas inlet is located at the lower half of the stripper riser of the stripper.

10. The system of claim 1, wherein the stripper comprises a settling section, a stripping section, and the regenerator comprises a settling section, a regenerating section, and a stripping section;
- wherein an upper end of the fast fluidized bed reactor is connected to and in fluid communication with the stripper settling section and a lower end of the fast fluidized bed reactor is connected to and in fluid communication with the stripper stripping section;
- wherein a first end of the stripper stripping section is connected to and in fluid communication with the regenerator settling section via a stripper inclined pipe and a regenerator riser; and
- wherein a first end of the regenerator stripping section is connected to and in fluid communication with the stripper settling section via a regeneration inclined pipe and a stripper riser.

11. The system of claim 1, wherein, the fast bed fluidized reactor is operated such that a gas phase linear velocity in the fluidized bed reactor is a range of 2 to 10 m/s.

12. The system of claim 1, wherein the regenerator comprises a bubbling fluidized bed regenerator or a turbulent fluidized bed regenerator.

13. The system of claim 1, wherein the catalyst comprises a microsphere catalyst.

14. The system of claim 13, wherein the microsphere catalyst has an average diameter in the range of 30 to 300 microns.

15. The system of claim 2, wherein the regenerator comprises a bubbling fluidized bed regenerator or a turbulent fluidized bed regenerator.

16. The system of claim 3, wherein the regenerator comprises a bubbling fluidized bed regenerator or a turbulent fluidized bed regenerator.

17. The system of claim 4, wherein the regenerator comprises a bubbling fluidized bed regenerator or a turbulent fluidized bed regenerator.

18. The system of claim 5, wherein the regenerator comprises a bubbling fluidized bed regenerator or a turbulent fluidized bed regenerator.

19. The system of claim 6, wherein the regenerator comprises a bubbling fluidized bed regenerator or a turbulent fluidized bed regenerator.

20. The system of claim 7, wherein the regenerator comprises a bubbling fluidized bed regenerator or a turbulent fluidized bed regenerator.

* * * * *